(12) United States Patent
Clark et al.

(10) Patent No.: US 7,136,938 B2
(45) Date of Patent: Nov. 14, 2006

(54) COMMAND ORDERING BASED ON DEPENDENCIES

(75) Inventors: Scott D. Clark, Rochester, MN (US); Scott M. Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 10/401,258

(22) Filed: Mar. 27, 2003

(65) Prior Publication Data
US 2004/0210679 A1 Oct. 21, 2004

(51) Int. Cl.
*G06F 3/00* (2006.01)
(52) U.S. Cl. ............................... 710/6; 710/55
(58) Field of Classification Search .................. 710/6, 710/7, 52, 55, 57, 5; 712/216, 217, 225
See application file for complete search history.

(56) References Cited

U.S. PATENT DOCUMENTS 5,959,932 A * 9/1999 MacLellan et al. .... 365/230.05
5,987,588 A * 11/1999 Popescu et al. .............. 712/23
6,510,474 B1 * 1/2003 Stracovsky et al. .......... 710/58

OTHER PUBLICATIONS

Harry Newton, Newton's telecom dictionary, Feb. 2002, CMP books, 18th edition, p. 682.*

* cited by examiner

*Primary Examiner*—Henry W. H. Tsai
(74) *Attorney, Agent, or Firm*—Owen J. Gamon

(57) ABSTRACT

A method, apparatus, system, and signal-bearing medium that in various embodiments determine whether to execute a command in a queue or whether to wait until another command or commands completed. The determination is based on a combination of an in-use vector and a scorecard vector. The in-use vector indicates which slots in various queues contain commands. The scorecard vector indicates the dependencies between various queues. In this way, the scorecard vector, and the thus the queue dependencies can be set and modified after the logic that processes the commands has been designed.

25 Claims, 5 Drawing Sheets

COMMAND ORDERING BASED ON DEPENDENCIES

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to the ordering of execution of commands in command queues.

BACKGROUND

Computers typically contain a bus, which may be a set of hardware lines or conductors used for information transfer between the various components of the computer system, such as the processor, the memory, and the input/output ports. A bus typically consists of specialized groups of lines that carry different types of information. For example, one group of lines might carry data, while another group of lines carries memory addresses where the data can be found, and still another group carries control signals. Some computers contain multiple buses, for example a system bus and an I/O (input/output) bus. These multiple buses might not have the same number of lines, and the lines might have different meanings. Thus, at the point where these multiple buses connect with each other, specialized hardware is needed to convert the interface of one bus into the interface of another bus. This specialized hardware is often contained within a chip or chips.

The chips used in such a bus interface often receive many different types of commands. Typically, these commands are placed into separate queues in order to maximize throughput, so that if a first queue that services commands of a first type is full, a second queue can still accept and make progress executing commands of a second type. With this approach, there are occasions where commands in the various queues need to be ordered with respect to each other to prevent unintentional out-of-order execution.

Ordering commands in queues has been accomplished by designing logic that searches through the queues looking for command dependencies and sets hold-off bits in a register to indicate that a particular command is dependent on another command or commands already in one of the queues and cannot proceed until the previously accepted command or commands complete. A common problem in designs of this type is that the rules for which commands are dependent upon each other are fluid and change late in the design cycle of the chip. Additionally, design flaws on either end of the bus interface may necessitate different hold-off conditions than the designer originally contemplated. Unfortunately, the logic that searches the queues and determines command dependencies cannot be changed without redesigning the chip. Thus, there is a need for a solution that allows flexibility in ordering commands in queues.

Although the aforementioned problems have been described in the context of a chip in a bus interface, they can apply in any context where commands on command queues need to be ordered with respect to dependencies that they might have on each other.

SUMMARY

A method, apparatus, chip, and electronic device are provided that in various embodiments determine whether to execute a command in a queue or whether to wait until another command or commands completed. The determination is based on a combination of an in-use vector and a scorecard vector. The in-use vector indicates which slots in various queues contain commands. The scorecard vector indicates the dependencies between various queues. In this way, the scorecard vector, and the thus the queue dependencies can be set and modified after the logic that processes the commands has been designed.

DETAILED DESCRIPTION

Figure 1:
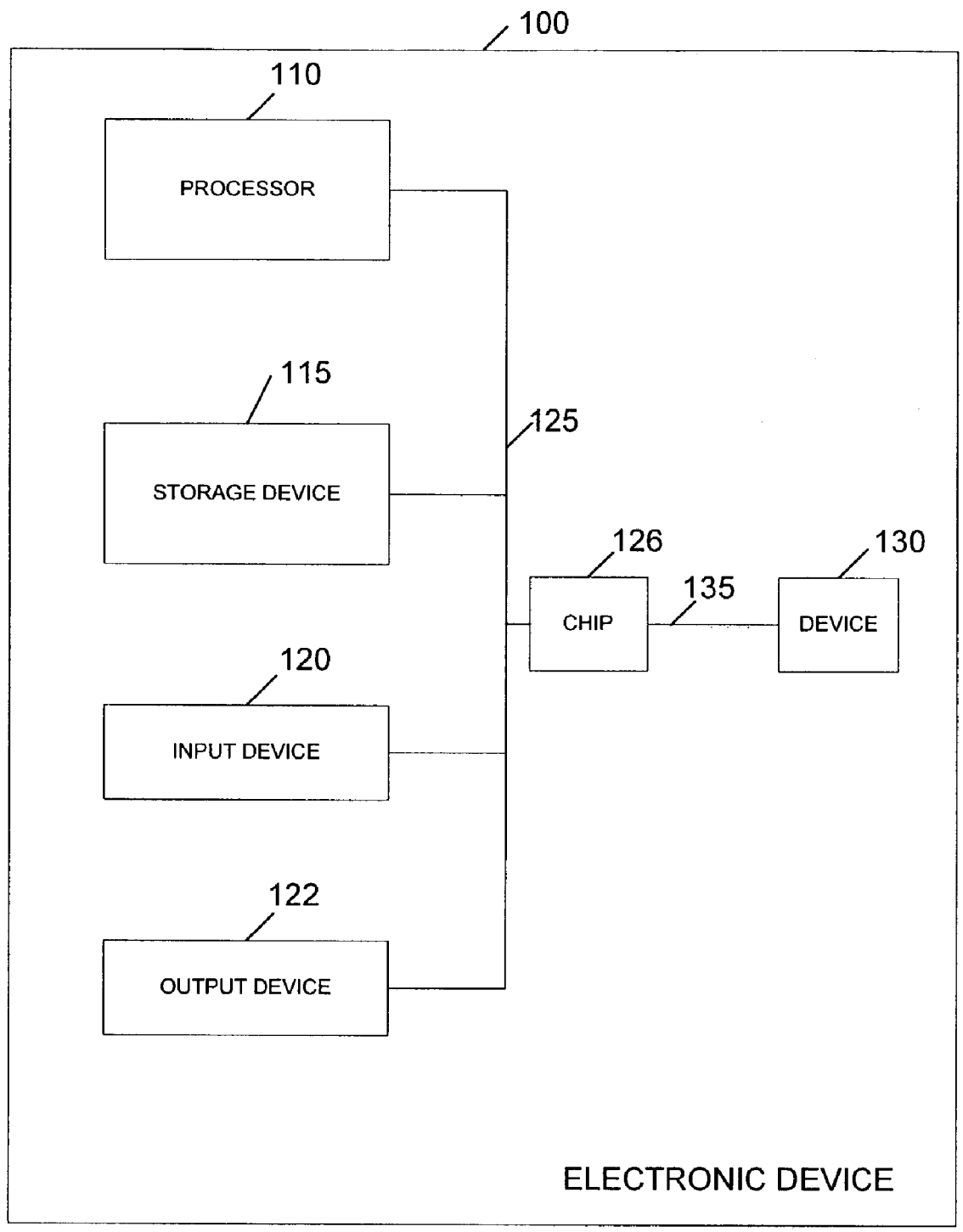
FIG. 1 depicts a block diagram of an example electronic device for implementing an embodiment of the invention.

FIG. 1 depicts a block diagram of an example electronic device 100 for implementing an embodiment of the invention. The electronic device 100 includes a processor 110, a storage device 115, an input device 120, an output device 122, and a chip 126, all connected directly or indirectly via a system bus 125.

The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 100 that controls the operation of the entire electronic device. Although not depicted in FIG. 1, the processor 110 typically includes a control unit that organizes data and program storage in memory and transfers data and other information between the various parts of the electronic device 100. The processor 110 reads and/or stores code and data to/from the storage device 115, receives input from the input device 120, and presents output to the output device 122.

Although the electronic device 100 is shown to contain only a single processor 110 and a single system bus 125, the present invention applies equally to electronic devices that may have multiple processors and multiple system buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present.

The input device 120 may be a keyboard, mouse or other pointing device, trackball, touchpad, touchscreen, keypad, microphone, voice-recognition device, or any other appropriate mechanism for the user to input data to the electronic device 100. Although only one input device 120 is shown, in another embodiment any number and type of input devices may be present.

The output device 122 may be a printer, display device, plotter, text-to-voice device, speaker, or any other appropriate mechanism to display information to the user of the electronic device 100. Although only one output device 122 is shown, in another embodiment any number and type of output devices may be present.

The system bus 125 may represent one or more busses, e.g., PCI, ISA (Industry Standard Architecture), X-Bus, EISA (Extended Industry Standard Architecture), or any other appropriate bus and/or bridge (also called a bus controller).

The chip 126 is further connected to bus 135, which is connected to a device 130. The chip 126 receives commands and/or data from the bus 125 and sends commands and/or data to the bus 135. In another embodiment, the chip 126 receives commands and/or data from the bus 135 and sends command and/or data to the bus 125. Although only one chip 126 is shown in FIG. 1, in another embodiment multiple chips, such as a chip set, may be present, and the chips may be commonly connected via a board, card, or other appropriate mechanism. A chip is a device, such as an integrated circuit, that consists of a number of connected circuit elements, such as transistors and resistors, fabricated on a single piece of semiconductor material. A chip set is a collection of chips designed to function as a unit in the performance of a common task. The terms "chip" and "chip set" are used herein interchangeably. The structure of the chip 126 is further described below with reference to FIG. 2, and the functions of the chip 126 are further described below with reference to FIGS. 3, 4, and 5.

In an embodiment the bus 135 is an I/O (Input/Output) bus, but in other embodiments the bus 135 may be any appropriate type of bus. In an embodiment the device 130 is an I/O device such as a storage device. In another embodiment, the device 130 is a network. In another embodiment, the device 130 is any device capable of receiving and/or sending commands and/or data. Although the device 130 is shown in FIG. 1 to be contained within the electronic device 100, in another embodiment the device 130 is external to the electronic device 100. Although only one device 130 is shown, in other embodiments multiple devices and multiple types of devices may be present.

The electronic device 100 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 100. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

As will be described in detail below, aspects of an embodiment of the invention pertain to specific apparatus and method elements implementable on a computer or electronic device. In another embodiment, the invention may be implemented as a program product for use with a computer or an electronic device. The programs defining the functions of this embodiment may be delivered to the adapter or electronic device via a variety of signal-bearing media, which include, but are not limited to:

(1) information permanently stored on a non-rewriteable storage medium, e.g., a read-only memory device attached to or within an adapter or electronic device, such as a CD-ROM readable by a CD-ROM drive;

(2) alterable information stored on a rewriteable storage medium, e.g., a hard disk drive or diskette; or (3) information conveyed to an adapter or electronic device by a communications medium, such as through a computer or a telephone network, including wireless communications.

Such signal-bearing media, when carrying machine-readable instructions that direct the functions of the present invention, represent embodiments of the present invention.

Figure 2:
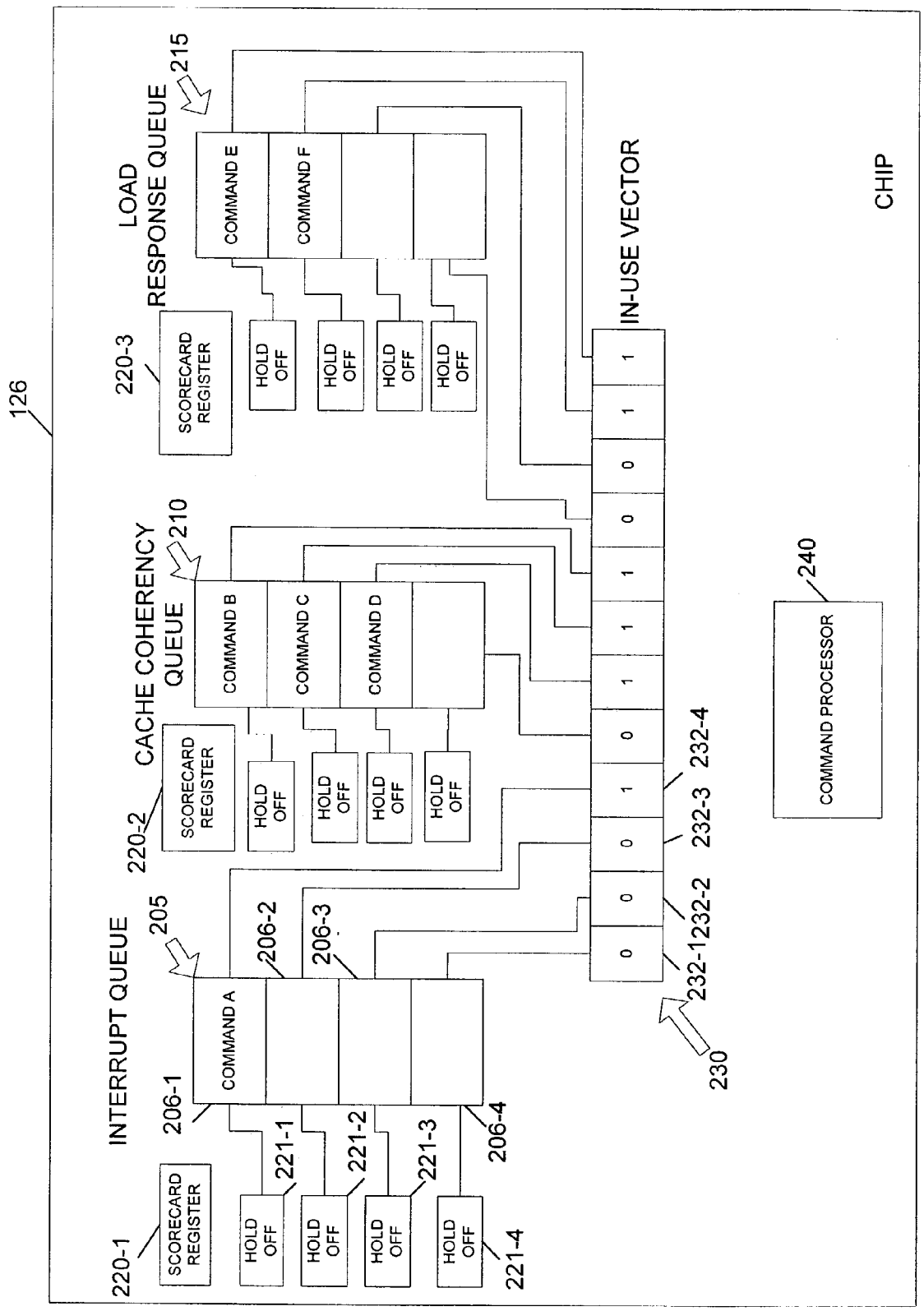
FIG. 2 depicts a block diagram of an example chip for implementing an embodiment of the invention.

FIG. 2 depicts a block diagram of an example chip 126 for implementing an embodiment of the invention. The chip 126 includes an interrupt queue 205, a cache coherency queue 210, and a load response queue 215.

The specific number and types of queues shown are exemplary only, and in other embodiment, any number and type of queues may be present. For example, in other embodiments, a read/write command to internal facilities queue, a read/write command to external facilities queue, or any other appropriate type of queue may be used.

Each queue has a number of command slots to hold commands. For example, the interrupt queue 205 includes command slots 206-1, 206-2, 206-3, and 206-4. In the example shown, the command slot 206-1 holds a command entitled "Command A," while command slots 206-2, 206-3, and 206-4 are empty. The cache coherency queue 210 contains four command slots with respective commands "Command B," "Command C," "Command D," and one empty slot. The load response queue 215 contains four command slots with respective commands "Command E," "Command F," and two empty slots. Although in the example shown, all queues have four command slots, in other embodiments, the queues may have any number and varying numbers of command slots.

In an embodiment, the queues 205, 210, and 215 are FIFO (First-In-First-Out) queues, meaning that commands are removed only in the same order in which they were inserted. But, in other embodiments, commands are assigned priorities within the queues and are removed and processed in an order based on the priorities. In another embodiment, the commands may be removed and processed from a particular queue in any appropriate order.

The chip 126 further includes scorecard registers 220-1, 220-2, and 220-3 associated with each respective queue 205, 210, and 215. In the example shown, interrupt queue 205 has associated scorecard register 220-1, cache coherency queue 210 has associated scorecard register 220-2, and load response queue 215 has associated scorecard register 220-3. Although the scorecards 220-1, 220-2, and 220-3 are shown to be registers, in another embodiment any storage location may be used to store vector values in the scorecard. In an embodiment the values in the scorecard registers are set by the designer of the chip 126 to indicate each queue's dependencies on other queues. The scorecard registers allow the designer to determine the dependencies between the queues at run time, rather than making these determinations early in the design cycle of the chip 126 before the chip has been committed to silicon and coding the command ordering rules into the silicon. Although the values in the scorecard registers have been described as being set by the designer of the chip 126, in other embodiments, the values in the scorecard registers may be set via any appropriate mechanism. In various embodiments, the values in the scorecard registers may be set using a LSSD (Level Sensitive Scan Design), or I2C (Inter Integrated Circuit Bus, JTAG (Joint Test Action Group) interface via test equipment or a computer. In another embodiment, the chip 126 may receive a store instruction from the bus 125 that contains values, which the chip 126 writes to the scorecard registers.

The chip 126 further includes hold-off vectors associated with each command slot in each queue 205, 210, and 215. For example, the command slot 206-1 is associated with the hold-off vector 221-1, the command slot 206-2 is associated with the hold-off vector 221-2, the command slot 206-3 is associated with the hold-off vector 221-3, and the command slot 206-4 is associated with the hold-off vector 221-4. Similarly, the command slots in the queues 210 and 215 also have associated respective hold-off vectors. In an embodiment, the hold-off vectors are stored in registers, but in another embodiment any appropriate storage location may be used to store the hold-off vectors.

The hold-off vectors indicate whether their respective command slots contain commands that are ready for execution or whether their respective command slots contain commands that must be held off waiting for another command or commands to execute first. The setting of the hold-off vectors is further described below with reference to FIGS. 3–5.

The chip 126 further includes an in-use vector 230, which indicates which slots in which queues contain commands. The in-use vector 230 includes respective in-use slots associated with each respective command slot in each of the queues 205, 210, and 215. In the example shown, each slot contains one bit, and when the bit is "1" the corresponding command slot in the corresponding queue contains a command, and when the bit is "0" the corresponding slot in the corresponding queue does not contain a command. But, in other embodiments, the slots in the in-use vector 230 may be of any size and any appropriate encoding may be used.

In the example shown, the in-use slot 232-1 contains a "0" indicating that the command slot 206-4 is empty; the in-use slot 232-2 contains a "0" indicating that the command slot 206-3 is empty; the in-use slot 232-3 contains a "0" indicating that the command slot 206-2 is empty; and the in-use slot 232-4 contains a "1" indicating that the command slot 206-1 contains a command. In an analogous fashion, the remaining in-use slots in the in-use vector 230 are encoded to correspond to the state of the cache coherency queue 210 and the load response queue 215. The setting and clearing of the in-use vector 230 is further described below with reference to FIGS. 4 and 5. The in-use vector 230 is used in conjunction with the scorecard registers 220-1, 220-2, and 220-3 to create the hold-off vectors as further described below with reference to FIGS. 3 and 4.

The chip 126 also includes a command processor 240, which inserts and retrieves commands to/from the queues 205, 210, and 215, and sets and clears the in-use vector 230 and the hold-off vectors. In an embodiment, the command processor 140 receives values from the bus 125 via a store instruction or other command and writes the values into the scorecard registers 220-1, 220-2, and 220-3. The functions of the command processor 240 are further described below with reference to FIGS. 3 and 4. In an embodiment, the functions of the command processor 240 are implemented in hardware via logic gates and other hardware components. In another embodiment, the command processor 240 includes instructions capable of being executed on an unillustrated processor, but analogous to the processor 110 (FIG. 1).

Although the various components in FIG. 2 are shown as all being included within the chip 126, in other embodiments some or all of them may be on separate chips, cards, or boards.

Figure 3:
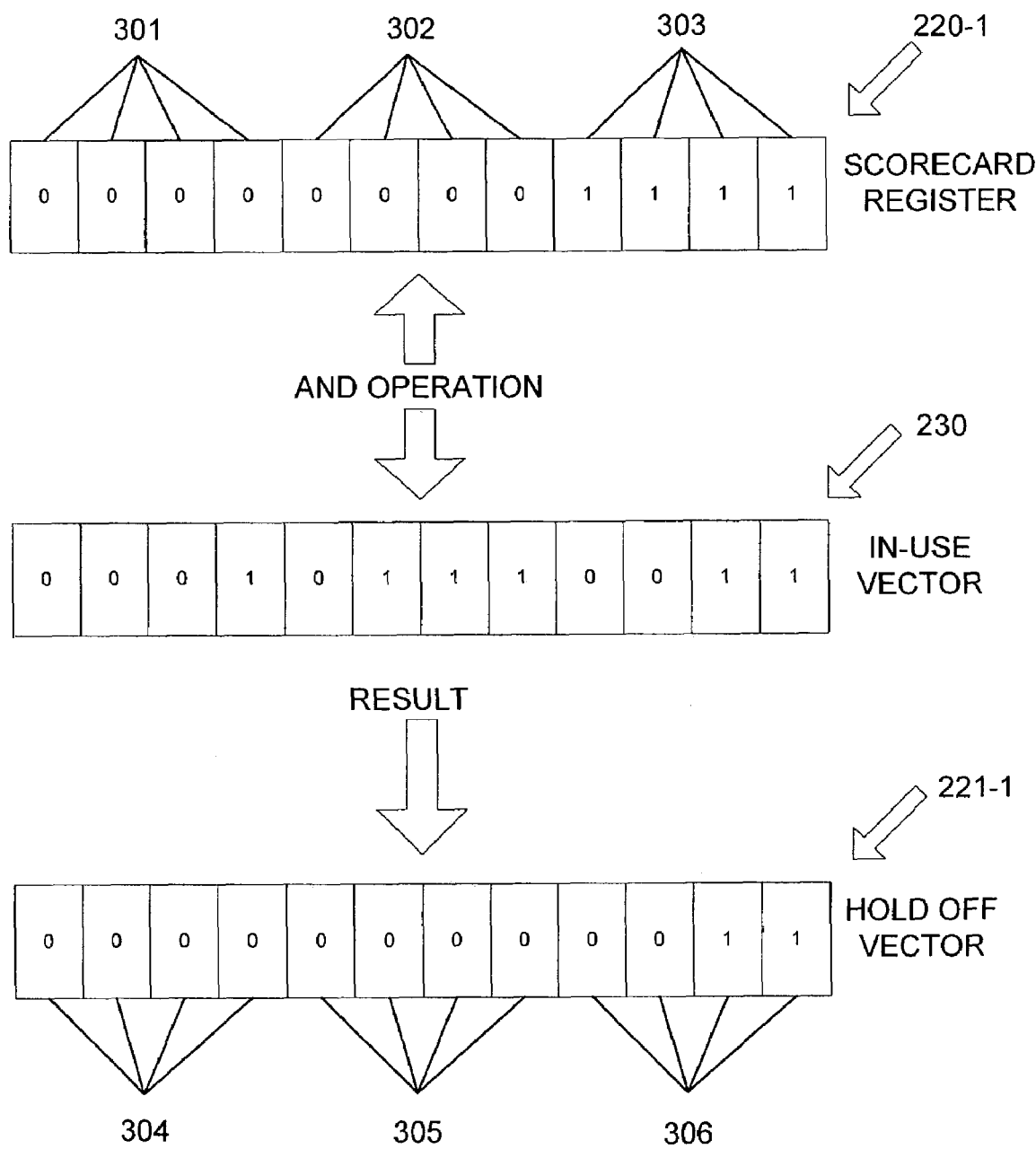
FIG. 3 depicts a block diagram of data structures used in an embodiment of the invention.

FIG. 3 depicts a block diagram of vectors used in an embodiment of the invention. The hold-off vector is created based on the in-use vector and the scorecard register. In the example shown, the hold-off vector 221-1 is created from a logical AND operation on the scorecard register 220-1 and the in-use vector 230.

The slots in the scorecard register 220-1 are grouped into three groups: group 301, group 302, and group 302. The scorecard slots in the group 301 are associated with the commands in the interrupt queue 205, the scorecard slots in the group 302 are associated with the commands in the cache coherency queue 210, and the scorecard slots in the group 303 are associated with the commands in the load response queue 215.

In an embodiment, when a slot in the scorecard register contains a "0," the command associated with the slot may be execute in any order. In an embodiment, when a slot in the scorecard register contains a "1," the command corresponding to the slot needs to be executed before other commands. But, in other embodiments any appropriate encoding may be used.

In the example shown, the slots in groups 301 and 302 are all "0," indicating that commands in the interrupt queue 205 do not need to wait for other commands (if present) in the interrupt queue 205 and the cache coherency queue 210. In the example shown, the slots in groups 303 are all "1," indicating that the commands in the interrupt queue 205 do need to wait for other commands (if present) in the load response queue 215. The values illustrated in the scorecard register 220-1 are examples only and any values may be used.

The slots in the hold-off vector 221-1 are grouped into three groups: group 304, group 305, and group 306. The hold-off vector slots 304 are associated with the commands in the interrupt queue 205, the hold-off vector slots 305 are associated with the commands in the cache coherency queue 210, and the hold-off vector slots 306 are associated with the commands in the load response queue 215.

In an embodiment, when a slot in the hold-off vector contains a "0," the associated command queue slot does not contain a command that needs to execute prior to the command associated with the entire hold-off vector. In an embodiment, when a slot in the hold-off vector contains a "1," the associated command queue slot contains a command that needs to execute prior to the command associated with the entire hold-off vector. Thus, when the entire hold-off vector is non-zero, the command in the command slot associated with the entire hold-off vector needs to wait, or hold off, until the hold-off vector becomes zero.

In an embodiment when a slot in the in-use vector 230 contains a "0," the associated slot in the associated command queue is empty with no valid command. In an embodiment when a slot in the in-use vector 230 contains a "1," the associated slot in the associated command queue contains a command.

Although the data structures of FIG. 3 have been described in terms of "0" and "1" any appropriate encoding scheme may be used.

Figure 4:
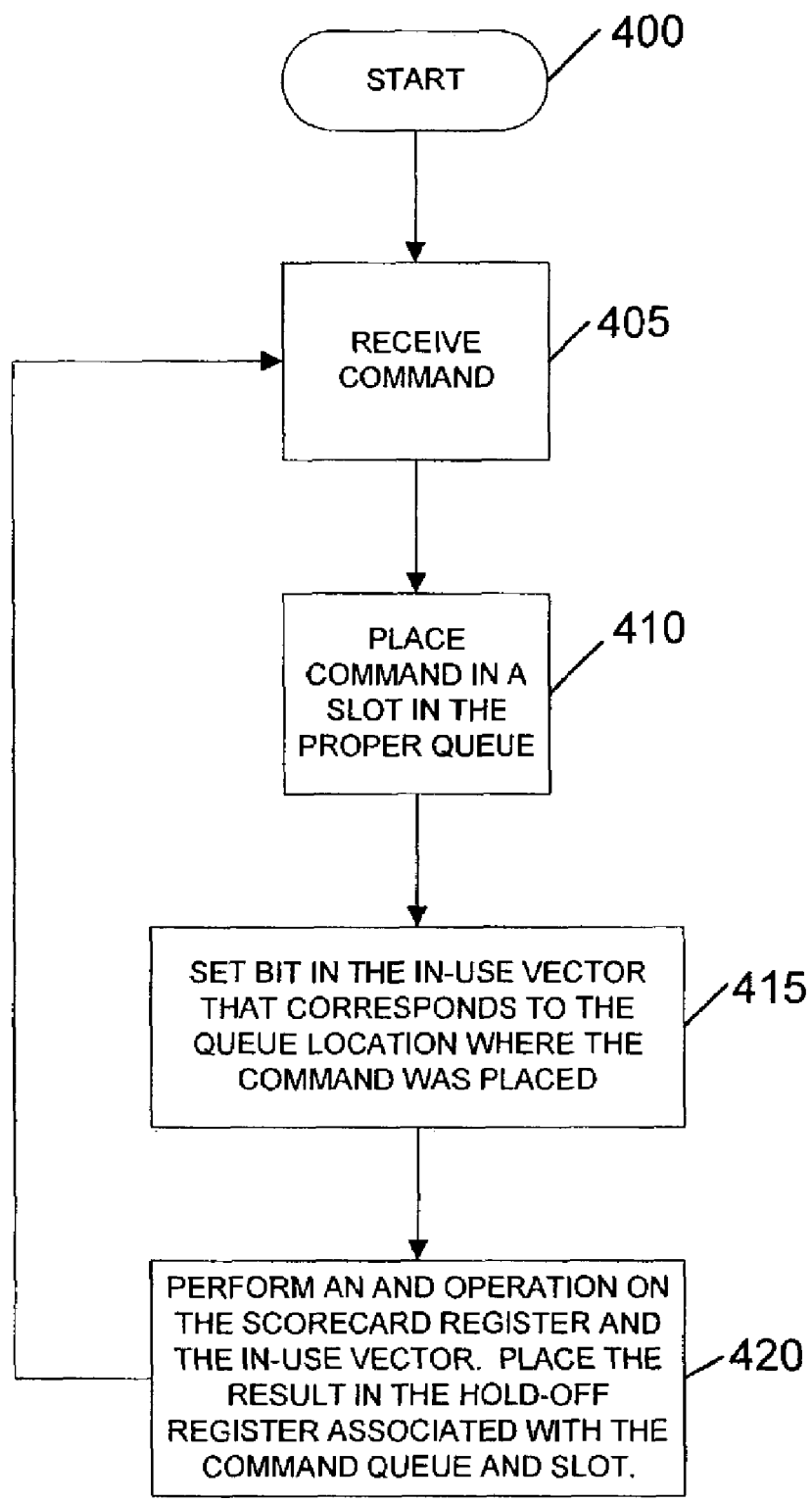
FIG. 4 depicts a flowchart of example processing for receiving commands, according to an embodiment of the invention.

FIG. 4 depicts a flowchart of example processing for receiving commands, according to an embodiment of the invention. Control begins at block 400.

Control then continues to block 405 where the command processor 240 receives a command from the bus 125 or the bus 135. In another embodiment, the command processor 240 may receive the command from any appropriate entity. Control then continues to block 410 where the command processor 240 places the received command in an empty slot in the proper queue, depending on the type of command or any other appropriate criteria.

Control then continues to block 415 where the command processor 240 sets an indicator in the in-use vector 230 that corresponds to the queue location where the command was placed. Using the example of FIG. 2, if the command received at block 405 was "Command A," the command processor 240 places "Command A" in slot 206-1 in the interrupt queue 205 and sets the corresponding slot 232-4 to "1," although in other embodiments any appropriate encoding may be used.

Control then continues to block 420 where the command processor 240 performs a logical AND operation on the scorecard register associated with the proper queue (previously selected at block 405) and the in-use vector 230 and places the result in the hold-off register associated with the command queue and slot of the received command. Again, using the example of FIG. 2, if the command received at block 405 was "Command A," then the command processor 240 at block 420 performs a logical AND operation of the in-use vector 230 and the scorecard register 220-1 associated with the interrupt queue 205 and places the result in the hold-off register 221-1 associated with the slot 206-1 of the command queue 205. Thus, in this example, the hold-off register 221-1 now indicates for which commands the "Command A" must wait.

Control then returns to block 405 where the command processor 240 receives the next command, as previously described above.

Figure 5:
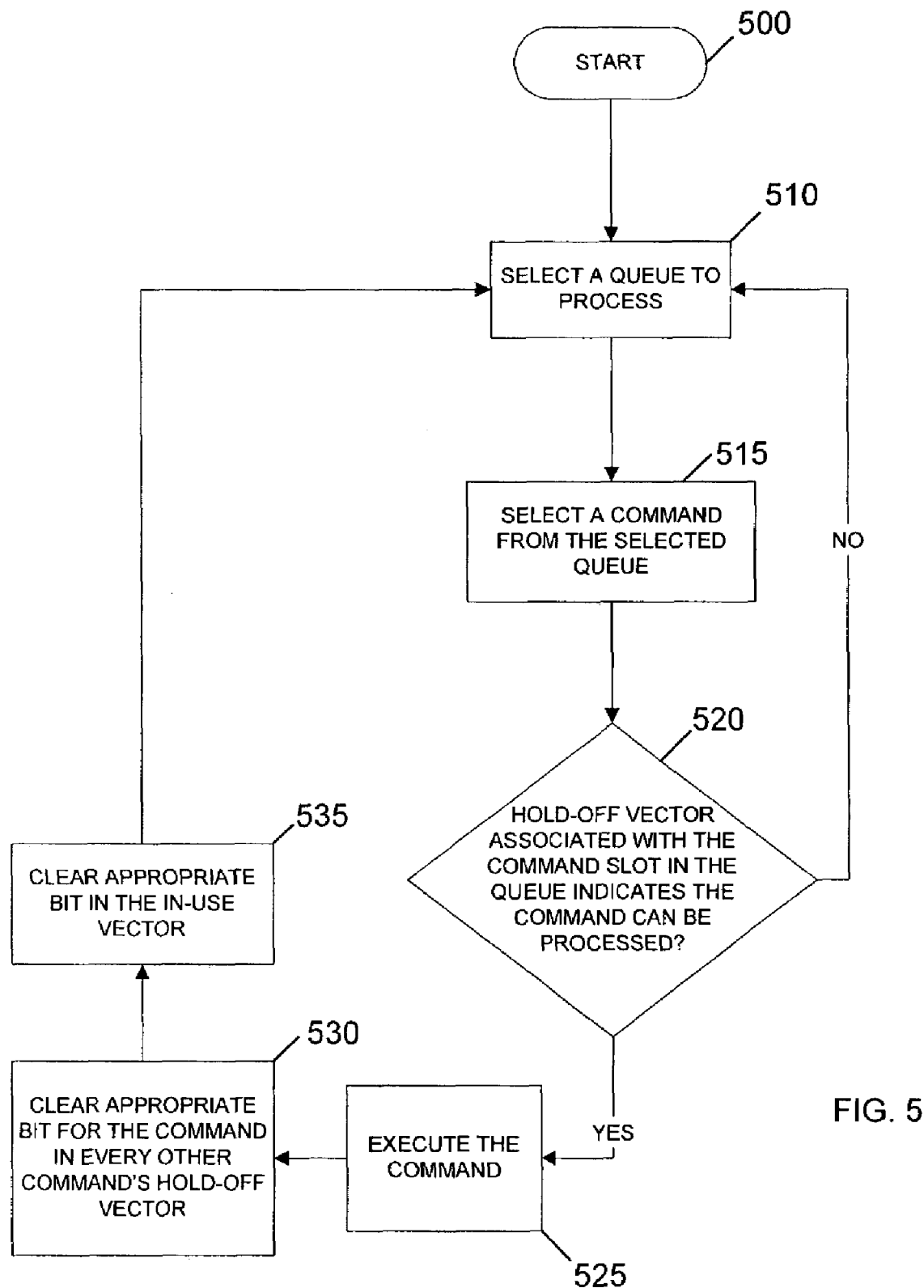
FIG. 5 depicts a flowchart of example processing for executing commands, according to an embodiment of the invention.

FIG. 5 depicts a flowchart of example processing for executing a command, according to an embodiment of the invention. Control begins at block 500.

Control then continues to block 510 where the command processor 240 selects a queue to process. In an embodiment, the command processor 240 selects a queue to process based on a round-robin selection technique. In another embodiment, the command processor 240 selects a queue based on a priority scheme where queues are given priorities and certain queues have a higher priority than other queues. In another embodiment, any appropriate technique may be used for selecting the next queue to process.

Control then continues to block 515 where the command processor 240 selects a command from a slot in the command queue that was previously selected in block 510. Using the example of FIG. 2, if the queue previously selected at block 510 was the interrupt queue 205, then at block 515 the command processor 240 selects "Command A" from slot 206-1.

Control then continues to block 520 where the command processor 240 determines whether the hold-off vector associated with the command slot in the queue indicates that the command may be executed. Using the example of FIG. 2, if the command processor 240 previously selected "Command A" from slot 206-1 at block 515, then at block 520, the command processor looks at the hold-off vector 221-1, which is associated with the slot 206-1. The hold-off vector 221-1 is shown in FIG. 3 to be non-zero, which in an embodiment means that the command needs to be held waiting for other commands to complete.

If the determination at block 520 is false, then control returns to block 510, as previously described above. In an embodiment, the determination at block 520 is false when the hold-off vector is non-zero.

If the determination at block 520 is true, then control continues to block 525 where the command processor removes the command from the selected slot in the selected command queue and executes the command. In an embodiment, the determination at block 520 is true when the hold-off vector is zero.

Control then continues to block 530 where the command processor 240 clears the appropriate bit for the just-executed command in every other command's associated hold-off vector. Control then continues to block 535 where the command processor 240 clears the appropriate bit associated with the just-executed command in the in-use vector 230. Control then returns to block 510, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method, comprising:
   determining whether to execute commands based on a combination of an in-use vector and a scorecard vector, wherein the in-use vector comprises a plurality of in-use slots that indicate which of a plurality of command slots in a plurality of queues contain the commands, and wherein the scorecard vector comprises a plurality of scorecard slots that each indicate whether dependencies exist between the plurality of queues, wherein the dependencies comprise whether the command associated with the scorecard slot needs to wait for execution of another of the commands in another of the plurality of queues;
   performing a logical AND operation on the in-use vector and the scorecard vector;
   setting a result of the logical AND operation in a hold-off register; and
   executing the commands when the hold-off register indicates no dependencies exist between the commands and the plurality of queues.

2. An apparatus comprising:
   means for setting an indication in a plurality of in-use slots in an in-use vector, wherein the indication indicates that a plurality of queue-slots in a plurality of queues contain commands; and means for setting a hold-off vector associated with the queue-slot based on a scorecard vector and the in-use vector, wherein the scorecard vector comprises a plurality of scorecard slots that each indicate whether dependencies exist between the plurality of queues, wherein the dependencies comprise whether the command associated with the scorecard slot needs to wait fur execution of another of the commands in another of the plurality of queues.

3. The apparatus of claim 2, wherein the means for setting the hold-off vector further comprises:
means for performing a logical AND operation on the in-use vector and the scorecard vector.

4. The apparatus of claim 2, further comprising:
means for executing the commands when the hold-off vector indicates the commands are free of a dependency with the plurality of queues.

5. The apparatus of claim 4, further comprising:
means for clearing the indication after the commands are executed.

6. The apparatus of claim 2, further comprising:
means for clearing a plurality of indications for the commands in a plurality of hold-off vectors associated with a plurality of queue-slots in the plurality of queues after the commands are executed.

7. The apparatus of claim 2, further comprising:
means for holding executing the commands when the hold-off vector indicates the commands have at least one dependency with the plurality of queues.

8. A storage medium encoded with instructions, wherein the instructions when executed comprise:
setting an indication in a plurality of in-use slots in an in-use vector, wherein the indication indicates that queue-slots in a plurality of queues contain commands; and
setting a hold-off vector associated with the queue-slot based on a scorecard vector and the in-use vector, wherein the scorecard vector comprises a plurality of scorecard slots that each indicate whether dependencies exist between the plurality of queues, wherein the dependencies comprise whether the command associated with the scorecard slot needs to wait for execution of another of the commands in another of the plurality of queues.

9. The storage medium of claim 8, wherein the setting the hold-off vector farther comprises:
performing a logical AND operation on the in-use vector and the scorecard vector.

10. The storage medium of claim 8, further comprising:
executing the commands when the hold-off vector indicates the commands are free of dependencies with the plurality of queues.

11. The storage medium of claim 10, further comprising:
clearing the indication alter the commands are executed.

12. The storage medium of claim 8, further comprising:
clearing a plurality of indications for the commands in a plurality of hold-off vectors associated with a plurality of queue-slots in the plurality of queues after the commands are executed.

13. The storage medium of claim 8, further comprising:
holding executing the commands when the hold-off vector indicates the commands have at least one dependency with the plurality of queues.

14. A chip comprising:
a plurality of queues;
a plurality of scorecard vectors associated with the respective queues, wherein each of the scorecard vectors comprises a plurality of scorecard slots that each indicate whether dependencies exist between the plurality of queues, wherein the dependencies comprise whether the command associated with the scorecard slot needs to wait for execution of another of the commands in another of the plurality of queues;
an in-use vector that comprises a plurality of in-use slots to indicate which of a plurality of command slots in the plurality of queues contain the commands; and
a command processor to set a result of a combination of the in-use vector and one of the plurality of scorecard vectors into a hold-off vector.

15. The chip of claim 14, wherein the command processor is further to:
place a command in one of the plurality of command slots and set an indication in the in-use vector that corresponds to the one of the plurality of command slots.

16. The chip of claim 15, wherein the command processor is further to:
clear the indication in the in-use vector after execution of the command.

17. The chip of claim 15, wherein the command processor is further to:
determine whether to allow execution of the command based on the hold-off vector.

18. The chip of claim 14, wherein the combination is a logical AND operation of the in-use vector and the one of the plurality of scorecard vectors.

19. The chip of claim 15, wherein the command processor is further to:
hold execution of the command when the hold-off vector indicates the command has at least one dependency with the plurality of queues.

20. An electronic device comprising:
a first bus;
a second bus; and
a chip connected to the first bus and the second bus, wherein the chip comprises a command processor to:
receive a plurality of commands from the first bus,
place the plurality of commands in a plurality of queues,
set an in-use vector that comprises a plurality of in-use slots to indicate which of a plurality of command slots in the plurality of queues contain the plurality of commands,
set a result of a logical AND operation on the in-use vector and a scorecard vector into a hold-off vector associated with one of the plurality of command slots, wherein the scorecard vector comprises a plurality of scorecard slots that each indicate whether dependencies exist between the plurality of queues, wherein the dependencies comprise whether the command associated with the scorecard slot needs to wait for execution of another of the commands in another of the plurality of queues, and
determine whether to execute one of the plurality of commands associated with the hold-off vector based on the hold-off vector.

21. The electronic device of claim 20, wherein the command processor is further to:
execute the one of the plurality of commands when the hold-off vector is zero.

22. The electronic device of claim 20, wherein the command processor is further to:
hold executing the one of the plurality of commands when the hold-off vector is non-zero.

23. The electronic device of claim 21, wherein the command processor is further to:
   clear an indication in the in-use vector after execution of the one of the plurality of commands.

24. The electronic device of claim 21, wherein the command processor is further to:
   clear a plurality of indications for the one of the plurality of commands in a plurality of hold-off vectors associated with a plurality of queue-slots in the plurality of queues after the one of the plurality of commands is executed.

25. The electronic device of claim 20, wherein the command processor is further to:
   write values into the scorecard vector.

* * * * *